A. B. NUROCK.
EGG BOILER.
APPLICATION FILED AUG. 26, 1919.

1,323,543.

Patented Dec. 2, 1919.

Inventor:
Adolph B. Nurock.
By Jas. H. Griffin.
Attorney.

UNITED STATES PATENT OFFICE.

ADOLPH B. NUROCK, OF NEW YORK, N. Y., ASSIGNOR OF ONE-HALF TO McMILLAN & WERNER, A FIRM COMPOSED OF BERNARD F. McMILLAN AND CHARLES J. WERNER, OF NEW YORK, N. Y.

EGG-BOILER.

1,323,543.  Specification of Letters Patent.  Patented Dec. 2, 1919.

Application filed August 26, 1919. Serial No. 319,942.

*To all whom it may concern:*

Be it known that I, ADOLPH B. NUROCK, a citizen of the United States, residing in the city of New York, borough of Manhattan, county and State of New York, have invented a certain new and useful Egg-Boiler, of which the following is a specification.

This invention relates to that type of devices used in a kitchen to facilitate the boiling of eggs, and is more particularly directed to what may be generally termed a wire basket formation adapted to support eggs individually with relation to a common handle, whereby a plurality of eggs may be picked up simultaneously and submerged in boiling water, as well as subsequently removed from said water and allowed to cool without chance of burning or scalding the hands of the operator.

Devices of this general character have long been in use, but are generally quite bulky and heavy, as well as inconvenient to store in a pantry when not in use. It has however, been suggested to provide collapsible egg-holders which overcome this objection, but, in every instance these collapsible holders are so constructed that after a relatively short period of use they fall apart, often resulting in the dropping and breaking of the eggs on the floor.

With these considerations in mind, the object of the present invention is to provide a collapsible egg boiler formed entirely of wire and so constructed that, when eggs are positioned therein the device cannot possibly become disrupted, break or fall apart.

Features of the invention other than those specified will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Figure 1:
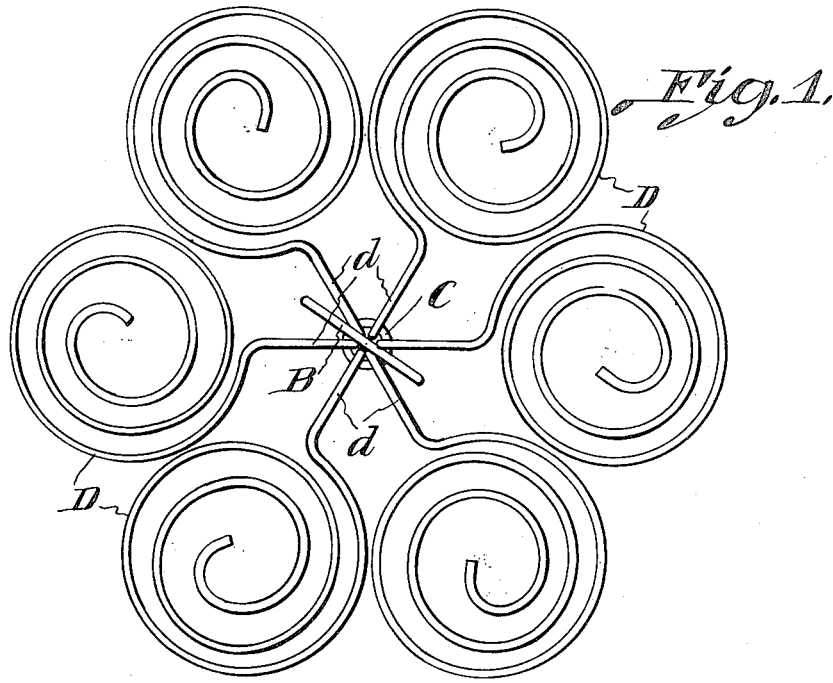
Figure 1 is a top plan view of my egg holder.
Figure 2:
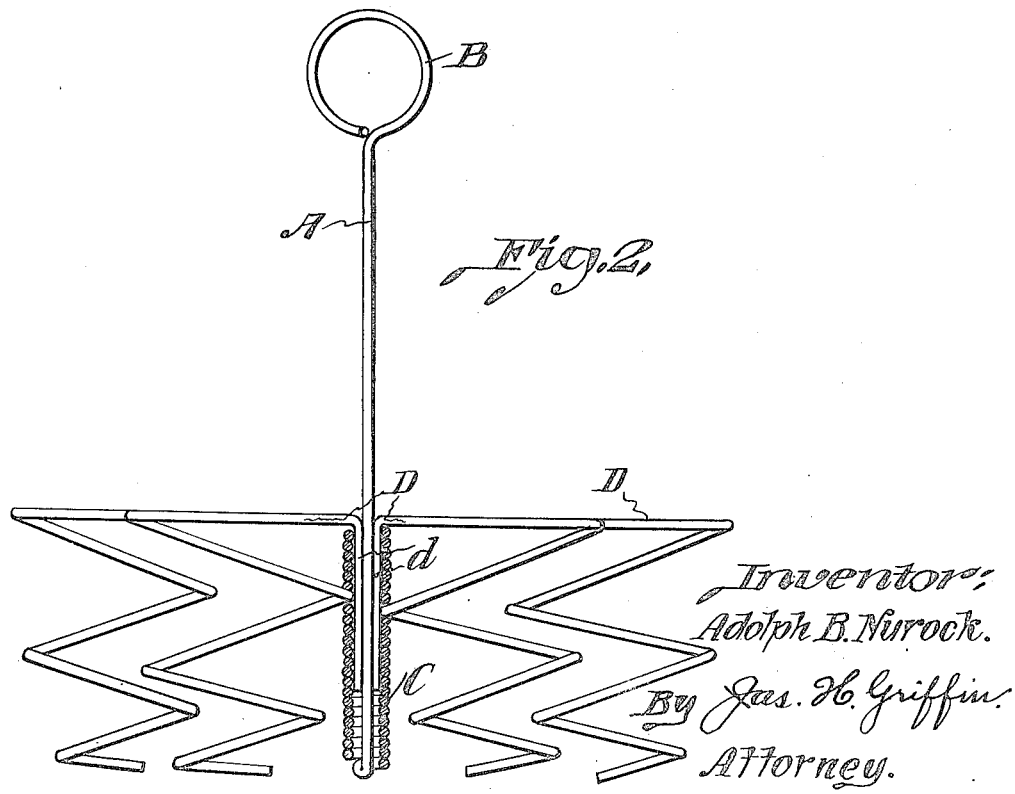
Fig. 2 is a side elevation with a part in section.

Referring to the drawings, it will be noted that the device embodies a handle portion A formed of wire and provided at one end with a loop B by means of which the device may be readily picked up. The shank of the loop B is preferably made straight, and at its opposite end is returned upon itself in the form of a plurality of helical convolutions or coils C which surround the normal lower end of the shank and are co-axial therewith as shown in Fig. 2. The coils C collectively form a sleeve about the lower end of the shank, and provide an annular recess or pocket which is adapted to house the stems $d$ of a plurality of wire baskets D.

Each wire basket D is formed from a length of wire bent in the form of a spiral so proportioned as to readily receive and support an egg, while the stem $d$ of the basket is straight and extends in substantially parallel relation to the axis of the spiral basket D. Any number of such baskets may be employed, but in any instance the stems $d$ thereof are adapted to be seated in the annular recess about the shank of the handle and thus support the baskets on the handle. When the baskets D are of the spiral form illustrated they may be all swung around to one side of the handle portion whereupon the convolutions of such spirals will interfit with one another and the device will partake of a compact formation allowing it to be readily stowed in a small space in the pantry.

I prefer to make the baskets of the spiral shape described although other forms of baskets may be employed without departing from the spirit of this invention. It is preferable, however, that the eggs fit the baskets in a more or less loose embrace, since, I have found in practice, that when eggs positioned in a basket so constructed are submerged in boiling water any egg in the group which may have become spoiled will immediately leave the basket and come to the top of the water.

The salient feature of this invention which not only clearly differentiates it from all prior egg-holders of this general type but renders it far more serviceable and efficient, is the fact that the sleeve portion which surrounds the shank of the handle is formed from a continuation of the wire of the handle as clearly shown in Fig. 2. The advantage of this construction is that the device is much stronger, more economical to manufacture and more durable, and, at the same time, this organization of the parts maintains the shank and sleeve portions at all times co-axial with respect to one another, thereby facilitating the positioning of the stems *d* of the egg baskets between these parts, as well as their subsequent manipulation into compacted or expanded conditions.

In the process of manufacturing a device of this invention it is carried out entirely by machinery. The forming of the wire coil sleeve on the handle portion being the result of one operation. The device may thus be made very economically and possesses the advantage over all prior art devices that the coil wire sleeve is integral with the shank of the handle, and cannot possibly break loose or become disrupted from the handle portion as invariably results when these parts are soldered, riveted or otherwise assembled. Moreover, the structure is very rigid and there is no tendency of the shank of the handle to slide longitudinally of the sleeve, either when assembling the basket members, or when placing the eggs in, or removing them from the boiling water, so that inadvertent splashing of the water on the hands of the user will not result from the use of the present device.

Having thus fully described the invention, what I claim as new, and desire to secure by Letters Patent is:

1. An egg boiler embodying a handle portion formed from wire and having an integral co-axial sleeve formed by returning the wire at the lower end of the handle upon itself in the form of superimposed coils to provide an annular seat or pocket about the lower portion of the handle portion, and a plurality of wire baskets provided with stems seated in the annular pocket of the handle portion to support the wire baskets in annular relation about the sleeve.

2. An egg boiler embodying a wire handle portion having at its lower end an integral sleeve formed by bending the wire which forms a continuation of the handle portion into a plurality of superimposed coils to provide a pocket interiorly of the sleeve, and a plurality of wire baskets, each of which is provided with a stem, adapted to seat in the pocket interiorly of the sleeve for the purpose of supporting the wire baskets on the handle portion.

3. An egg boiler embodying a wire handle portion having at its lower end an integral sleeve formed by bending the wire which forms a continuation of the handle portion into a plurality of superimposed coils to provide a pocket interiorly of the sleeve, and a plurality of wire baskets, each of which is formed from a plurality of superimposed coils of wire, and the wire of each of said baskets being bent to form a shank which is seated in the pocket within the sleeve for the purpose of supporting the wire baskets on the handle portion.

In testimony whereof I have signed my name to this specification.

ADOLPH B. NUROCK.